Nov. 21, 1939.　　　G. LAUBE ET AL　　　2,180,683
SOUND INSULATION MEANS FOR MOTION PICTURE CAMERAS
Filed Dec. 11, 1937
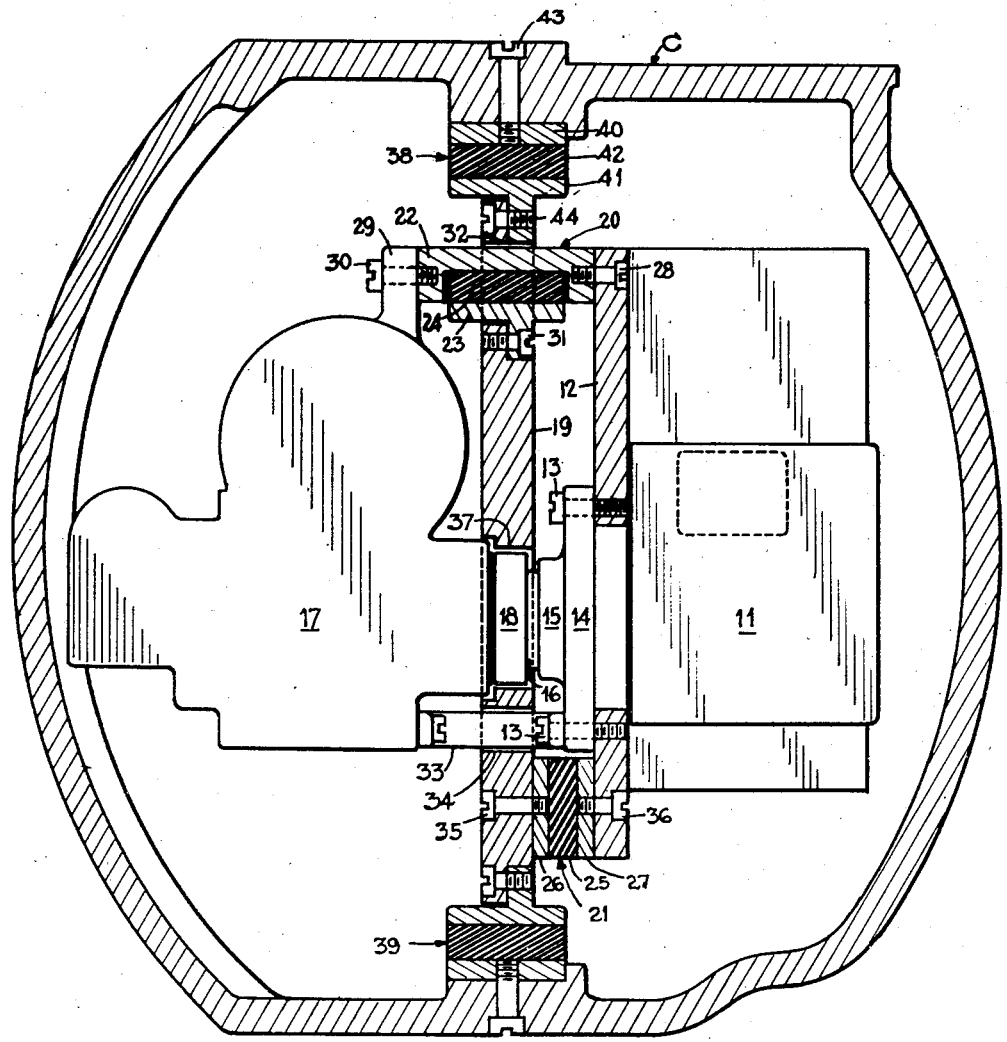
INVENTORS.
Grover Laube,
Chas. M. Miller,
Rob't. C. Stevens
BY Rob't. L. Gunn
ATTORNEY.

Patented Nov. 21, 1939

2,180,683

UNITED STATES PATENT OFFICE 2,180,683

SOUND INSULATION MEANS FOR MOTION PICTURE CAMERAS

Grover Laube, Robert Colby Stevens, and Charles Melvin Miller, Los Angeles, Calif., assignors to Twentieth Century-Fox Film Corporation, Los Angeles, Calif., a corporation of New York Application December 11, 1937, Serial No. 179,322

6 Claims. (Cl. 88—18)

This invention relates to a means for insulating against the transmission of sound vibrations and deals particularly with the application of this method and means to a motion picture camera to reduce the noise level of operation.

The hereinafter described invention is a continuation in part of a co-pending application Serial No. 24,240, filed May 31, 1935, on Motion picture camera now Patent Number 2,104,948.

The primary object of this invention is to provide a means for reducing noise in motion picture cameras. In this respect it is known that the motion picture camera, as it is used today, must be enclosed in a soundproof cabinet in order to render it quiet enough for use in motion picture studios for shooting scenes where sound is recorded. In the above mentioned co-pending application certain structure and design of parts have been shown which are conducive to noise reduction in motion picture cameras. The present invention goes further and shows a way and a means in addition to the arrangement and design of parts for further reducing noise in motion picture cameras. More specifically, it is the object of this invention to provide a mounting for the internal moving parts of a motion picture camera wherein the said moving parts are insulated from the main supporting member by a train of sound wave absorbing and frequency changing members.

The concept of this invention is based upon the fact that if a series of masses of appreciable magnitudes are connected and separated by elastic members there is a change in frequency, due to the inertia of the masses, and an absorption of vibration by the elastic members in the transmission of sound waves through such a train of members. In motion picture cameras there is admittedly a certain amount of irreducible vibrations set up, due to the intermittent film moving mechanism, which unless absorbed or changed in frequency will transmit an audible frequency to the case and thereby set up objectionable noises. These frequencies may be of a high fine frequency characteristic together with lower frequencies characterized by power. In our invention we propose to absorb the high frequencies and to change the lower frequencies into frequencies below the audible range. We accomplish this by mounting the mass of the film moving mechanism upon an elastic member which in turn is mounted upon a mass member having sufficient inertia to resist fine frequency vibrations. This whole mass in turn is mounted upon another final mass by means of another elastic member interposed therebetween. The final mass should be of such magnitude that the natural period of resonance will fall below the audible frequency range. Under this arrangement any frequency set up by the film moving mechanism either of a fine high frequency character, or of a low power order of frequency, would be absorbed by the elastic members or would be changed by the inertia of the masses into a final output frequency corresponding to the resonant frequency of the final mass. Therefore, if the resonant frequency of the final mass is below the audible range it is obvious that frequencies produced by the film moving mechanism are being transmitted through such a train of members will either be absorbed or changed in accordance with the resonant frequency of the output member which, being below the audible range, would be unobjectionable.

Other objects and advantages will become apparent as the description proceeds in conjunction with the drawing in which:

The figure is a cross section of a motion picture camera showing one way in which our method and means may be applied to the same.

In the co-pending application hereinbefore mentioned attention was given to the design of parts and the arrangement of parts particularly for reducing noise. As a result, all fast reciprocating parts were made as light as possible and the movement of these parts was confined as much as possible to a uniformly accelerating and decelerating movement. However, in spite of these precautions it was recognized that a certain amount of vibration would be set up by the intermittently moving parts of the film moving mechanism. Such vibration, if transmitted to the external case or the supporting member, would naturally produce objectionable noise. In order to reduce this objectionable noise a new method for mounting the film moving mechanism within the case was conceived. Briefly stated the means employed in this method consists of a series of masses connected by elastic members. The arrangement and description of such mounting will now be entered.

In the figure we have shown a typical mounting of the foregoing character as it might be used in a motion picture camera. Here it will be observed that an intermittent film moving mechanism generally designated 11 is mounted upon a plate 12 by means of bolts 13 extending through a flange 14 of a hub 15. The hub 15 is the essential part of the film moving mechanism and supports the mechanism on the plate 12. A rotatable drive shaft 16 extends through the hub 15 and drives the moving parts of the film moving mechanism. The drive shaft 16 is connected to a gear box generally designated 17 through a flexible connection generally designated 18. It is to be understood that the gear box may be driven by any suitable drive member such as a motor, not shown. As shown the plate 12 is supported upon another plate 19 by elastic members generally designated 20 and 21 in their entirety. These members may be made in the form of strip members running the full length of the plate to be supported or they may be made as block members to conform to whatever type of construction may be used. Referring to the member 20, it will be seen that this member consists of a rigid metal channel 22 and a metal strip 23 having an elastic material, preferably rubber 24, bonded therebetween. The member 21 is similar in construction; the only difference being in the shape of the metal members bonded to the rubber. In this case, a rubber member 25 is bonded between flat plates 26 and 27. Referring again to the member 20 and the channel 22 of this member, it will be observed that the plate 12 is mounted upon the channel 22 in any suitable manner such as by means of bolts 28 while the gear box 17 is mounted upon the other side of the channel 22 by means of a lug 29 which may be an integral of the gear box and a bolt 30 extending through the lug, and into the channel 22. The metal strip 23 of the member 20 is mounted upon the plate 19 by any suitable structure which in this instance consists of a bolt 31 passing through a flange on the member 23 and the plate 19. As will be noted the plate 19 has an opening 32 therein and the member 22 is arranged in this opening so that it does not touch any part of the plate 19. In order to hold the gear case in rigid relation to the intermittent movement mechanism a leg 33 is mounted on the lower part of the gear box and extends to the flange 14 of the film moving mechanism. An opening 34 is formed in the plate 19 to permit free passage of the leg 33 through the plate 19 without any contact therewith. The lower part of the plate 12 is mounted upon the plate 19 by the member 21 and for this purpose we use bolts 35 and 36 extending through plates 19 and 12 into members 26 and 27, respectively, of the member 21. Attention is called to the fact that the plate 19 is formed with an opening 37 adapted to permit the connection of the gear box 17 to the film moving mechanism so that the plate 19 does not contact any of the mechanisms mentioned.

The plate 19 in turn is mounted upon the case through elastic members generally designated 38 and 39. These members as shown are duplicates of each other and a description of one will serve for both. As illustrated they consist of plates 40 and 41 having rubber 42 bonded therebetween. The plate 40 is attached to the camera case C in any suitable manner such as by bolts 43. The plate 41 is attached to the plate 19 in any suitable manner such as by means of bolts 44 extending through the plate 19 and a flange member on the plate 41. The foregoing structure supports both the intermittent film moving mechanism and the gear driving mechanism upon a series of elastic members interposed between mass members. Any sound wave vibration therefore, that would be transmitted to the camera case must either travel through the train of mass members separated by elastic members to the case or be transmitted through air waves to the interior of the case and through the case to the outside air. In designing the train of mass members separated by elastic members, the object, as before stated, was to associate mass and elasticity that absorption of sound waves and change in frequency of sound wave vibration would be effected. In this connection it will be noted that the noise producing elements, namely, the intermittent film moving mechanism and the gear box drive are separated from the camera case, which is the supporting member, by a train of mass members separated by elastic members. It will also be noted that the noise producing elements are associated with and are a part of a considerable mass which being at the source of the noise, tends to reduce the high frequency characteristics of the noise. The result is that the major part of the frequency set up will be of a low frequency order and may carry considerable power. The inertia of the mass members is dependend upon to lower the frequency of the lower vibrations below audibility while the elastic members absorb the fine higher frequencies. It is obvious that since the mass members in the supporting train will resonate at a natural period of resonance in response to frequency vibrations set up by the film moving mechanism, and that the final output member which is the camera case, being of such mass that the inertia of the same responds to only a low order of frequency, the final output frequency may be lowered by this method and means to such a range of frequency that it would be unobjectionable.

Although we have shown and described our invention as it would be applied to a motion picture camera, nevertheless it is obvious that the method, and the means with slight modification, could be used in other devices for the same purpose. We, therefore intend the invention to be limited only by the scope of the appended claims.

We claim:

1. In a motion picture camera having a film moving mechanism, a gear drive and a case, means for mounting said film moving mechanism and said gear drive within said case, said means including elastic members mounted upon said case, a comparatively large, dense, heavy plate mounted upon said elastic members, elastic members mounted upon said plate and means for mounting said intermittent film moving mechanism and said gear drive upon said last mentioned elastic members.

2. In a motion picture camera having a case, an intermittent film moving mechanism and a gear drive for driving said film moving mechanism; a comparatively large, dense, heavy plate within said case; elastic members bonding and supporting said plate upon said case with both sides of said plate free from contact with any part of said case; and elastic members bonding and supporting said intermittent film mechanism and said gear drive upon said plate.

3. In a motion picture camera having a case, an intermittent film moving mechanism and a gear drive for driving said film moving mechanism; a comparatively large, dense, heavy plate dividing said case into two compartments; elastic members bonding said plate to said case and forming the sole support therefor upon said case; and elastic members bonding said intermittent film mechanism and said gear drive to said plate and forming the sole support for the same upon said plate.

4. A motion picture camera comprising: a case; a plate having sufficient mass to damp sound vibrations passing therethrough; elastic means for bonding and supporting said plate upon said case; a film moving mechanism on one side of said plate; a gear drive operably connected to said film moving mechanism on the opposite side of said plate; and elastic means for jointly bonding and supporting said film moving mechanism and said gear drive upon said plate.

5. A motion picture camera comprising: a case; an inertia plate mounted within said case and dividing the case into two compartments, said plate having an opening therethrough; elastic members bonding and supporting said plate upon said case; a film moving mechanism on one side of said plate; a driving mechanism on the opposite side of said plate; means passing through said opening for operatively connecting said driving mechanism to said film moving mechanism without contacting said plate; and elastic members for bonding and supporting said film moving mechanism and said driving mechanism upon said plate.

6. A motion picture camera comprising a case, an inertia plate in said case dividing the same into two compartments, said plate having an opening therethrough, sound damping members bonding and supporting the edges of said plate within said case, an intermittent film moving mechanism on one side of said plate, a driving mechanism on the opposite side of said plate, means passing through the opening in said plate for operatively connecting said driving mechanism to said film moving mechanism without contacting said plate and sound damping means for bonding and supporting said film moving mechanism and said driving mechanism upon said plate.

GROVER LAUBE.
ROBERT COLBY STEVENS.
CHARLES MELVIN MILLER.